United States Patent Office 2,853,511
Patented Sept. 23, 1958

2,853,511
PENTAERYTHRITOL BROMHYDRIN NITRATES

Friedrich Boedecker, Berlin-Dahlem, and Hans Volk, Berlin-Tempelhof, Germany, assignors to Firma Riedel-de Haen Aktiengesellschaft, Seelze, near Hannover, Germany No Drawing. Application May 6, 1955, Serial No. 506,675. In Germany January 11, 1949

Public Law 619, August 23, 1954
Patent expires January 11, 1969

4 Claims. (Cl. 260—467)

The present invention relates to nitric acid acid esters (nitrates) of pentaerythritol bromhydrins.

In accordance with the present invention, the said nitrates, which may be defined as pentaerythritol bromhydrin nitrates which contain from one to three Br atoms and from one to three nitrate (—$ONO_2$) groups, i. e. correspond to the formula

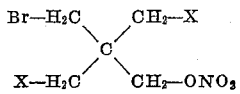

wherein X is Br or —$ONO_2$. are prepared from the corresponding parent pentaerythritol mono-, di- or tribromhydrin by the action of concentrated (98–100% by weight) nitric acid.

The thus-prepared pentaerythritol monobromhydrin trinitrate, pentaerythritol dibromhydrin dinitrate, and pentaerythritol tribromhydrin mononitrate are effective medicaments in the treatment of heart and vascular ailments, being characterized, relative to comparable known compounds, by essentially longer lasting and more intense effects. The compounds may be administered for example orally.

The following examples illustrate the preparation of the compounds of the invention. In these examples, the relationship between parts by weight and parts by volume is the same as that between grams and milliliters. Percentages are by weight. Temperatures are in degrees centigrade.

Example 1

12.5 parts by weight of pentaerythritol monobromhydrin are stirred into 60 parts by volume of nitric acid (98–100% concentration) at 5–10°. Stirring is continued for 2 to 3 more hours at 10–15°, after which the resultant crystal slurry is poured onto about 70 parts by weight of crushed ice. After allowing the mass to stand for 1 to 2 hours, it is suction-filtered, and the thus-isolated pentaerythritol monobromhydrin trinitrate

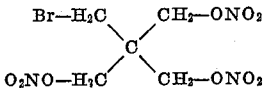

is thoroughly washed with water and then dried at moderate heat. The yield amounts to 17.7 parts by weight. The product, recrystallized from 50 parts by volume of methyl alcohol, is in the form of colorless crystals which melt at 90–92°.

Example 2

150 parts by weight of pentaerythritol dibromhydrin are stirred into 580 parts by volume of nitric acid (98–100% concentration) at 5–10° in the course of 2 to 3 hours. The resultant crystal slurry is poured onto crushed ice. After allowing the mass to stand for 1 to 2 hours, it is suction-filtered, and the thus-isolated pentaerythritol dibromhydrin dinitrate

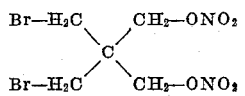

is thoroughly washed with water and then dried at moderate heat. The yield amounts to 195 parts by weight. By recrystallization from the double quantity of methyl alcohol, the product is obtained in the form of almost colorless crystalline needles which melt at 75°.

Example 3

19 parts by weight of pentaerythritol tribromhydrin are stirred into 75 parts by volume of nitric acid (98–100% concentration) at 5–10°. Stirring is continued for 2 to 3 more hours at 10–15°, after which the resultant crystal slurry is poured onto about 70 parts by weight of crushed ice. After allowing the mass to stand for 1 to 2 hours, it is suction-filtered, and the thus-isolated pentaerythritol tribromhydrin mononitrate

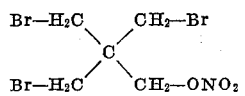

is thoroughly washed with water and then dried at moderate heat. The yield amounts to 21 parts by weight; melting point=50–54°. The product, recrystallized from the double quantity of methyl alcohol, melts at 58–60°.

Example 4

An appropriate quantity of pentaerythritol dibromhydrin dinitrate, for example 25 milligram, is tabletted in a conventional tabletting machine with a fourfold to fivefold quantity of pentaerythritol. The so-prepared tablets may be administered perlingually singly or in multiples, as required (usual dose being 1 to 2 tablets, per day 3 to 5 tablets).

The pentaerythritol dibromhydrin dinitrate may be replaced in the preceding formulation by the like quantity of either or the other hereinbefore disclosed new compounds.

The said compounds, thus administered in the form of tablets or in other suitable manner are particularly useful for the prevention of seizures and also for the relief of acute attacks of pain in angina pectoris. As aforeindicated, they have an especially longlasting action. They are also useful in the symptomatic treatment of hypertension.

Having thus disclosed the invention, what is claimed is:

1. A pentaerythritol bromhydrin nitrate containing one to three Br atoms and one to three nitrate groups, the sum of the Br atoms and nitrate groups being four.
2. Pentaerythritol monobromhydrin trinitrate.
3. Pentaerythritol dibromhydrin dinitrate.
4. Pentaerythritol tribromhydrin mononitrate.

References Cited in the file of this patent
FOREIGN PATENTS 806,438    Germany _____ June 14, 1951